United States Patent [19]

Miyasaka

[11] Patent Number: 4,956,832

[45] Date of Patent: Sep. 11, 1990

[54] TRACKING-DEVIATION DETECTOR APPARATUS CAPABLE OF PREVENTING OVERWRITING OF DATA ON AN ADJACENT TRACK

[75] Inventor: Toshiyuki Miyasaka, Yokohama, Japan

[73] Assignee: Kabushiki Kaisha Toshiba, Kawasaki, Japan

[21] Appl. No.: 246,719

[22] Filed: Sep. 20, 1988

[30] Foreign Application Priority Data

Sep. 21, 1987 [JP] Japan .................. 62-236775

[51] Int. Cl.$^5$ .................................................. G11B 7/00
[52] U.S. Cl. .................... 369/44.11; 369/54; 369/58; 369/116
[58] Field of Search .............. 358/342; 369/32, 43–47, 369/54–58, 116, 124; 346/766

[56] References Cited

U.S. PATENT DOCUMENTS

| 4,554,652 | 11/1985 | Maeda et al. ................. 369/44 |
| 4,669,072 | 5/1987 | Miura et al. ................. 369/54 X |
| 4,800,548 | 1/1989 | Koishi et al. ................. 369/54 |

FOREIGN PATENT DOCUMENTS 0249996 12/1987 European Pat. Off. .

Primary Examiner—Robert L. Richardson
Attorney, Agent, or Firm—Finnegan, Henderson, Farabow, Garrett and Dunner

[57] ABSTRACT

An optical apparatus includes an objective lens for directing a light beam on a disk medium to record data. The light beam from the disk medium is detected so as to generate a track-error signal. This track-error signal represents a location of the light beam with respect to a track of the disk medium. The optical apparatus further includes a flip-flop circuit for detecting a level of the amplitude of the track-error signal. Data recording is prohibited by an AND gate when the amplitude of the track-error signal exceeds the level.

5 Claims, 4 Drawing Sheets

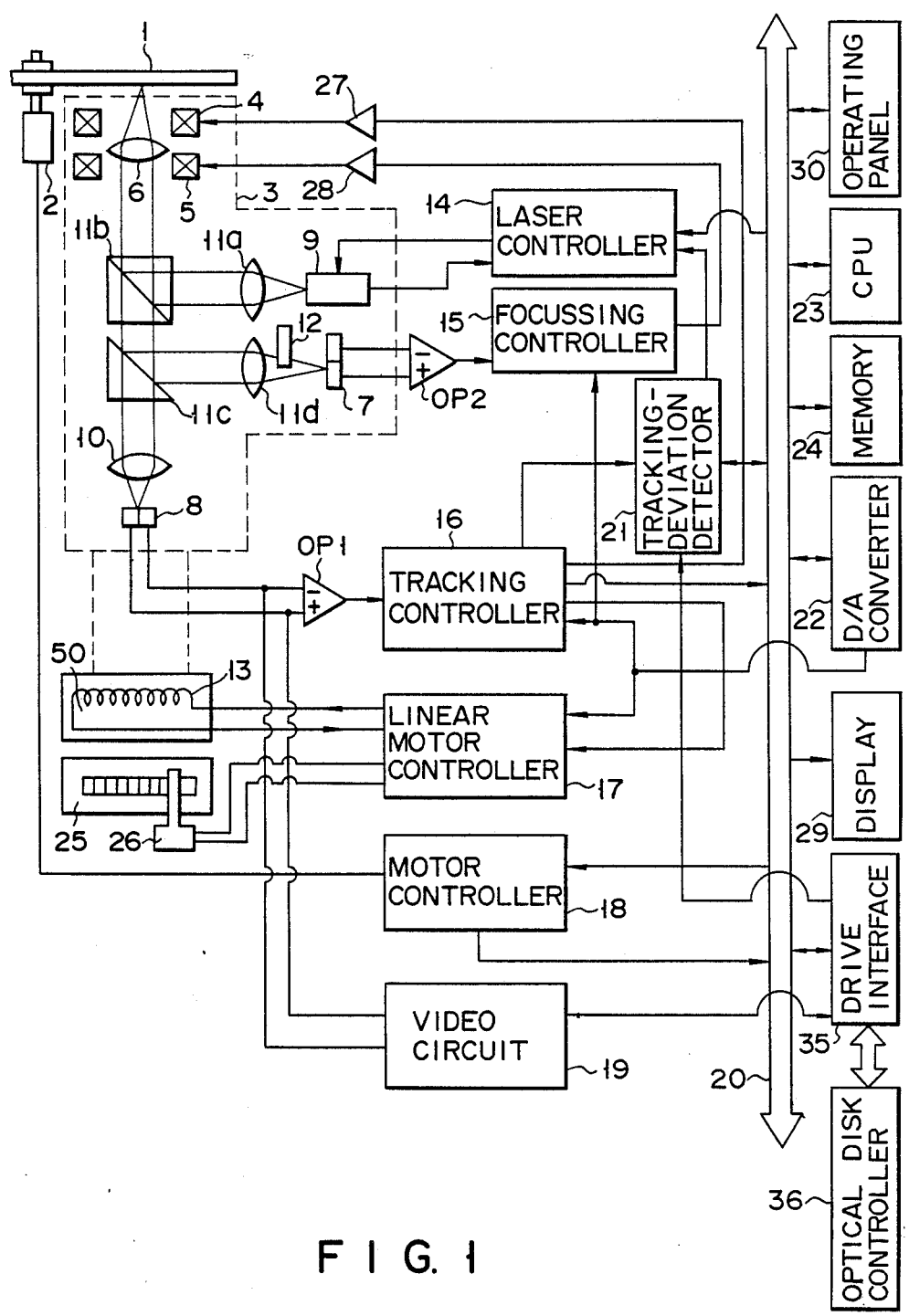
F I G. 1

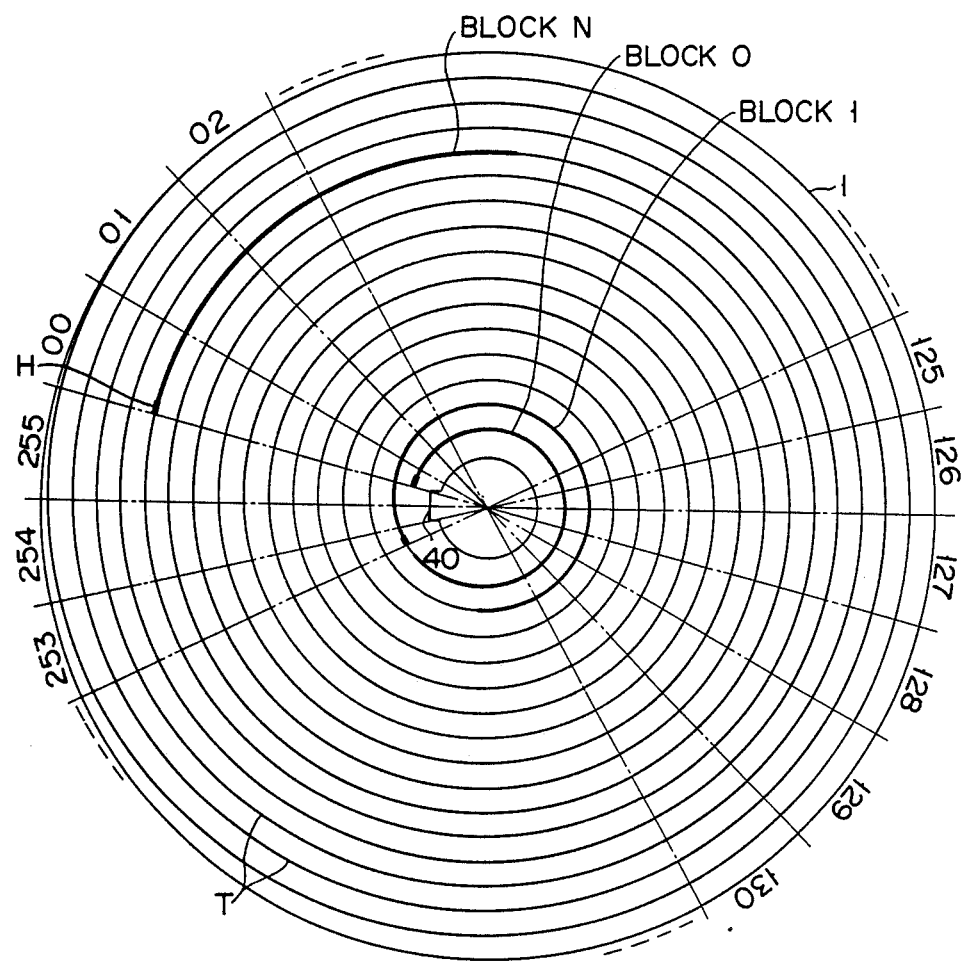
F I G. 2

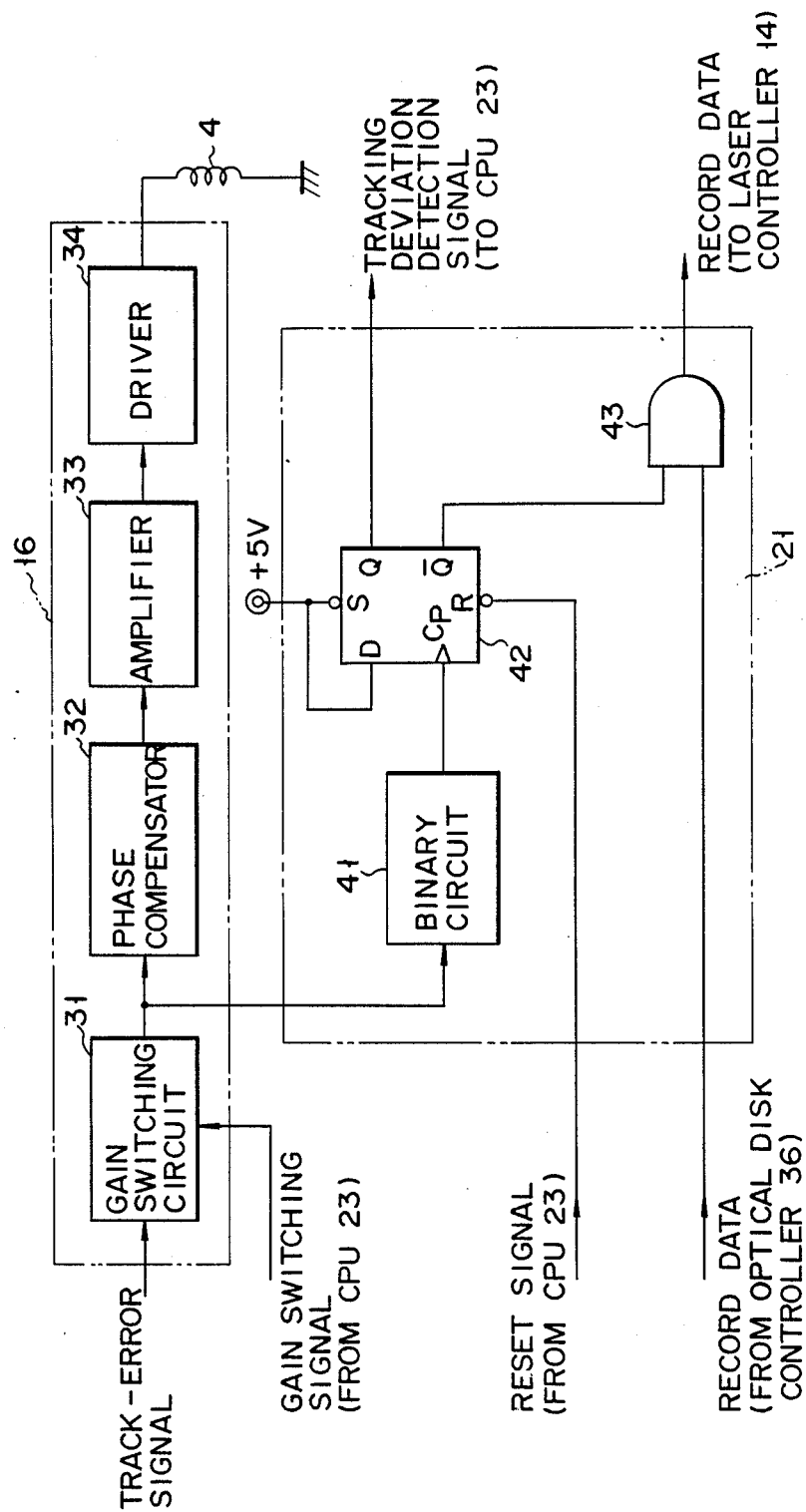
F I G. 3

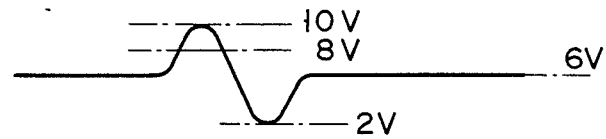
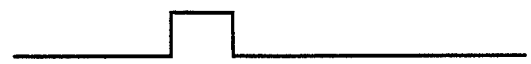
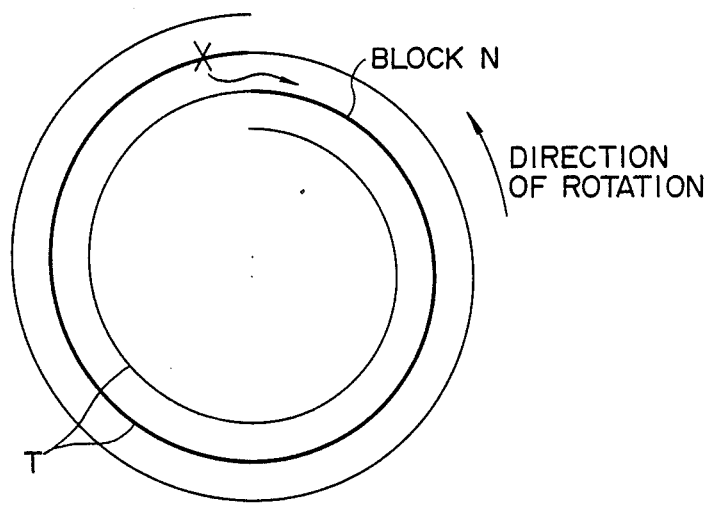
FIG. 5

TRACKING-DEVIATION DETECTOR APPARATUS CAPABLE OF PREVENTING OVERWRITING OF DATA ON AN ADJACENT TRACK

BACKGROUND OF THE INVENTION

1. Field of the Invention

The present invention relates to an optical data recording/reproducing apparatus, and, more particularly, to a tracking-deviation detector apparatus which detects a tracking deviation during data recording to prevent overwriting of data on an adjacent track.

2. Description of the Related Art

A disk medium is one type of recording mediums used in optical data recording/reproducing apparatuses. A disk has several sectors set in its radial direction, and has a number of tracks set along the concentric circles of the sectors. Each track has a number of pits provided, which represent data.

To accurately record data on such optical disk using a laser beam, it is necessary to control the position of an objective lens, etc. so that the laser beam is properly irradiated on a predetermined position on a track. More specifically, when the spot of the laser beam is deviated from a predetermined pit position due to eccentricity of the disk or deformation of tracks, a servo mechanism works and the objective lens is moved according to the amount of the deviation so that the beam spot is shifted to the predetermined pit position. This is generally called tracking servo control, which is accomplished by, for example, the three spot methods, the wobbling method, or the push-pull method.

Japanese patent publication No. 58-55566 discloses an example of tracking servo control in which an electrical feedback circuit is provided for controlling a motor device used for shifting a lens, the amount of the shift depending on a voltage supplied from a photoelectric converter which converts light reflected from a track into electrical signals.

In spite of the tracking servo control, the spot of the laser beam sometimes can deviate from the predetermined pit position. This is called a tracking deviation. Such tracking deviation may result in undesirable overwriting of data on an adjacent track on which data has already been recorded, thus destroying the data recorded on the adjacent track.

To cope with the above problem, first, detection of a tracking deviation is required before undesirable overwriting occurs. Detecting methods include checking the consecutiveness of address data (data already recorded in a block, on a track, in a sector, etc.). For instance, if an address should not be read in the correct order or within a predetermined time, it would be discriminated that a tracking deviation had occurred. However, the overwriting often occurs before detecting the tracking deviation. So, as a solution to this, the use of two light beams has been considered; while data record/nonrecord is being detected with the preceding beam, data is recorded using the succeeding beam. This is, however, technically very difficult, and is not worked out yet.

Accordingly, there is a growing demand for some means with a simple structure, which can detect a tracking deviation during data recording and can prevent overwriting of data on an adjacent track upon detection of such a tracking deviation.

SUMMARY OF THE INVENTION

Accordingly, it is an object of this invention to provide a tracking-deviation detector apparatus with a simple structure capable of detecting a tracking deviation during data recording.

It is another object of this invention to provide a tracking-deviation detector apparatus capable of preventing overwriting of data on an adjacent track when a tracking deviation occurs during data recording.

To achieve the objects, there is provided an optical apparatus for focusing a light beam onto an object for recording data, the object having a preformed track for guiding the light beam, comprising: means for directing the light beam onto the object so as to record data; means for detecting the light beam from the object so as to generate a track-error signal representing a location of the light beam with respect to the track of the object, the track-error signal having a variable amplitude; means for detecting a level of the amplitude of the track-error signal generated by the generating means; and means for inhibiting the operation of the directing means when the amplitude of the track-error signal detected by the detecting means exceeds the level.

BRIEF DESCRIPTION OF THE DRAWINGS

The foregoing aspects and other features of the invention will be explained in the following description taken in conjunction with the accompanying drawings wherein:

FIG. 1 is a schematic block diagram of an optical data recording/reproducing apparatus to which a tracking-deviation detector apparatus embodying this invention is applied;

FIG. 2 is a diagram illustrating the surface structure of an optical disk on which data is to be recorded;

FIG. 3 is a diagram exemplifying the circuit arrangement of the tracking-deviation detector apparatus according to this invention;

FIGS. 4A-4E show waveforms used for explaining how data overwriting can be prevented; and FIG. 5 is a diagram illustrating a tracking deviation.

DETAILED DESCRIPTION OF THE PREFERRED EMBODIMENT

An embodiment of this invention will be described below with reference to the accompanying drawings.

An optical disk 1 on which data is to be recorded comprises a disk-shaped substrate of, for example, glass or plastic, and a metal coating layer or recording film, which is coated on the substrate in a doughnut shape and is composed of tellurium or bismuth. The metal coating layer has a cutaway or reference position mark 40 in the proximity of its center. Optical disk 1 has 256 sectors in its radial direction, which are given sector addresses from 0 to 255, the address 0 corresponding to reference position mark 40. Optical disk 1 further has approximately 36,000 tracks provided in spiral, each track having a number of pits representing data. Each track is divided into blocks amounting to 3,000,000. Each block has a block header A provided at its head portion, which includes data such as the block number and track number. This block header A may be provided at the time of manufacturing each optical disk. If a block in optical disk 1 does not end at a sector position, a block gap is provided so that next block should start from the sector position.

FIG. 1 is a diagram of an optical data recording/reproducing apparatus to which the tracking-deviation detector apparatus of this invention is applied. Optical disk 1 is rotatable by a DC motor 2 which is controlled by a motor controller 18. Data reproduction from optical disk 1 is carried out through an optical pickup 3. This optical pickup 3 is secured to a drive coil 13, which constitutes the movable section of a linear motor 50 and is coupled to a linear motor controller 17. This linear motor controller 17 is coupled to a linear motor position detector 26, which detects an optical scale 25 and produces a position signal. The fixed section of linear motor 50 is provided with a permanent magnet (not shown). Drive coil is excited by linear motor controller 17 so that optical pickup 3 can move in the radial direction of optical disk 1.

Optical pickup 3 comprises a semiconductor laser 9, a collimator lens 11a, a beam splitter 11b, an objective lens 6, a half prism 11c, focusing lenses 10 and 11d, a knife edge 12, and two pairs of photosensors 7 and 8.

Semiconductor laser 9 is driven by a laser controller 14, and its output laser beam is led to collimator lens 11a for collimation. The collimated beam is led to objective lens 6 by beam splitter 11b. Objective lens 6 focuses the received light beam on a predetermined track on the surface of optical disk 1. Reflection light from the disk's surface is led through objective lens 6 and beam splitter 11b to half prism 11c which in turn breaks up the reflection light into two components. One of the components is led through focusing lens 10 to a pair of photosensors 8 to be converted into an electric signal. The other component is led to the aforementioned photosensor pair 7 through focusing lens 11d and knife edge 12.

Optical pickup 3 further comprises drive coils 4 and 5 to drive objective lens 6. This objective lens 6, when driven by drive coil 5, is movable along the optical axis of lens 6, and is movable along the surface of optical disk 1 when driven by drive coil 4.

The output signals of photosensors 7 are supplied to an operational amplifier OP2. Operational amplifier OP2 produces a focus-error signal associated with the focal point of the laser beam, which is sent to a focusing controller 15. The output signal of this focusing controller 15 is supplied via amplifier 28 to focusing drive coil 5 to move objective lens 6 so that the laser beam is controlled to be focused on optical disk 1.

The output signals of the aforementioned photosensors 8 are supplied to an operational amplifier OP1, which produces a track-error signal associated with a position of the spot of a laser beam. This track-error signal is supplied to tracking controller 16, which supplies a tracking control signal to linear motor controller 17 as well as to drive coil 4, thereby controlling the tracking of the laser beam on a predetermined track on optical disk 1.

The outputs of photosensors 8 are also supplied to a video circuit 19, which reproduces image data and address data (the track number, sector number, etc.). The reproduced data can be displayed on a display 29.

Video circuit 19 is connected to an optical disk controller 36 via a drive interface 35. Optical disk controller 36 sends record data via drive interface 35 to a tracking-deviation detector 21 according to present invention. The record data is then sent to laser controller 14, which drives semiconductor laser 9 in accordance with the record data. However, the record data is not sent to laser controller 14 when tracking-deviation detector 21 detects a predetermined level of the track-error signal from tracking controller 16.

The aforementioned laser controller 14, focusing controller 15, tracking controller 16, linear motor controller 17, motor controller 18 and video circuit 19 are controlled by CPU 23 through a bus line 20. This CPU 23 executes a predetermined task in accordance with a program stored in a memory 24, in response to a command entered through an operating panel 30. D/A 22 is provided to permit data transmission among focusing controller 15, tracking controller 16, linear motor controller 17 and CPU 23.

FIG. 3 comprises the tracking controller 16 and the tracking-deviation detector 21 according to the present invention, and will be explained in detail. As shown in FIG. 3, tracking controller 16 comprises a gain switching circuit 31, a phase compensator 32, an amplifier 33 and driver 34. Gain switching circuit 31 amplifies the track-error signal from OP1 with different gains between data recording and data reproducing, in accordance with a gain switching signal supplied from CPU 23, and sends it to phase compensator 32 for phase compensation. The signal subjected to phase compensation in phase compensator 32 is amplified in amplifier 33 and then supplied to driver 34. In accordance with the received signal, driver 34 drives drive coil 4 to perform a tracking operation.

On the other hand, the tracking-deviation detector 21 comprises a binary circuit 41, a flip-flop (FF) circuit 42 and an AND gate 43, as shown in FIG. 3.

With the above structure, binary circuit 41 receives the track-error signal from gain switching circuit 31 and provides a binary signal of the track-error signal and sends it to a clock pulse input terminal $C_P$ of FF circuit 42. When the level of the binary signal exceeds a predetermined voltage level, say, 8V, FF circuit 42 outputs a tracking deviation detection signal to CPU 23 from its output terminal Q and outputs an inhibit signal to one input terminal of AND circuit 43 from its output terminal $\overline{Q}$. Consequently, AND circuit 43 inhibits supply of record data from CPU 23 to laser controller 14 while receiving the inhibit signal from the output terminal $\overline{Q}$ of FF circuit 42.

The operation of the circuit shown in FIG. 3 will be explained below.

Assume now that, at the time of data recording, record data from optical disk controller 36 is supplied to laser controller 14 through AND circuit 43 of tracking-deviation detector 21. Then, laser controller 14 permits an intermittent high current to flow to semiconductor laser 9 which in turn emits an intermittent, high-intensity flux of laser beam. When a high-intensity laser beam flux is not generated from laser 9, a low-intensity laser beam flux is generated therefrom.

Consequently, the laser beam is converted into a parallel flux of light by collimator lens 11a and reflected by beam splitter 11b to enter objective lens 6. Objective lens 6 focuses the incoming laser beam on the recording surface of optical disk 1 to record data in accordance with the record data from optical disk controller 36. Reflection light from optical disk 1 is led to half prism 11c through objective lens 6 and beam splitter 11b. The light led to half prism 11c passes it and enters photosensors 8 through focusing lens 10, as well as is reflected by the prism 11c and enters photosensors 7 through focusing lens 11d. As a result, photosensors 7 output two detection signals corresponding to the amount of the irradiated light. OP2 attains the difference between these two detection signals to generate a focus-error signal. Focusing controller 15 executes focusing compensation in accordance with the focus-error signal.

Photosensors 8 output two detection signals corresponding to the amount of the received light. OP1 attains the difference between these two detection signals to generate a track-error signal, and tracking controller 16 executes tracking compensation (or tracking deviation compensation) in accordance with the track-error signal. Specifically, the tracking compensation is done as follows. The track-error signal from OP1 is supplied to gain switching circuit 31, which in turn changes the gain between data recording and data reproducing to amplify the error signal, thereby providing a stable track-error signal even if the amount of a laser beam significantly varies. This track-error signal is subjected to phase compensation in phase compensator 32, amplified by amplifier 33, then supplied to driver 34. Driver 34 in turn applies a current corresponding to the received signal to drive coil 4. As a result, objective lens 6 is moved in the direction perpendicular to the optical axis of objective lens 6, whereby a tracking operation is carried out.

The track-error signal from gain switching circuit 31 is also supplied to binary circuit 41 to be converted into a binary (digital) signal. Let us assume that the track-error signal has a waveform such as shown in FIG. 4A (its amplitude is exceeding 8V). In this case, the track-error signal from gain switching circuit 31 becomes above the predetermined level and binary circuit 41 outputs a signal of level "1" as shown in FIG. 4B. Upon reception, at the clock input terminal $C_P$, of the level "1" signal from binary circuit 41, FF circuit 42 latches a signal of level "1" at its D input terminal and outputs a signal of level "1" (tracking deviation detection signal) from its output Q and a signal of level "0" (inhibit signal) from its output $\overline{Q}$, as shown in FIG. 4C.

The inhibit signal closes the gate of AND circuit 43 to stop the supply of record data (see FIG. 4D) from optical disk controller 36 to laser controller 14, as shown in FIG. 4E. Therefore, data recording is stopped at the time the tracking deviation as shown in FIG. 5 occurs.

Upon reception of the aforementioned tracking deviation detection signal, CPU 23 discriminates that there is a tracking deviation and sends a control signal to tracking controller 16 to move the beam spot back to the prior position.

After this is completed, CPU 23 sends a reset signal to the reset terminal R of FF circuit 42 to reset the circuit 42. This opens the gate of AND circuit 43 so that record data from optical disk controller 36 is supplied again to laser controller 14 to record data on optical disk 1.

As described above, when the track-error signal becomes above a predetermined level during data recording, a tracking deviation is detected and data recording is stopped immediately after the detection.

Accordingly, a tracking deviation during data recording can be detected with a simple arrangement, and overwriting of data on an adjacent track can be prevented upon detection of such tracking deviation.

It should be understood that while the present invention has been described in connection with one specific embodiment, other modifications will be apparent to one skilled in the art through a study of the specification, drawings and the following claims.

What is claimed is:

1. An optical apparatus for use in an optical disk controller having means for recording data via a light beam onto an object and means for reproducing data from the object, the apparatus comprising:
   directing means for directing the light beam onto a desired position on the object;
   tracking position detecting means for detecting the light beam reflected from the object during recording and for supplying a track-error signal, representing a deviation from the desired position of the light beam on the object, to the directing means;
   gain switching means for amplifying the track-error signal with different gains between data recording and data reproduction;
   inhibit signal generating means connected to the output of the gain switching means for comparing a level of the amplified track-error signal with a predetermined level and for outputting a write inhibition signal when the level of the amplified track-error signal exceeds the predetermined level; and
   record data control means for receiving the record data, and connected to the inhibit signal generating means for inhibiting the record data from being written in response to the write inhibition signal.

2. An optical apparatus as recited in claim 1, wherein the inhibit signal generating means comprises a digitizing circuit having an input connected to the gain switching means, and a flip-flop having an output connected to the record data control means.

3. An optical apparatus as recited in claim 2, wherein the optical disk controller comprises a CPU and the flip-flop outputs a tracking deviation detection signal to the CPU.

4. An optical apparatus as recited in claim 3, wherein:
   the directing means is responsive to a control signal generated by the CPU upon output of the tracking deviation detection signal to move the light beam to the desired position; and
   the flip-flop comprises a reset terminal responsive to a reset signal from the CPU to cease inhibition of the writing of the record data.

5. An optical apparatus as recited in claim 4, wherein the record data control means comprises an AND gate.

* * * * *